United States Patent [19]
Onda

[11] Patent Number: 5,867,768
[45] Date of Patent: Feb. 2, 1999

[54] SIMULTANEOUS MULTIDIRECTIONAL COMMUNICATION APPARATUS

[75] Inventor: Takeo Onda, Fujimi, Japan

[73] Assignee: Baldwin-Japan, Ltd., Tokyo, Japan

[21] Appl. No.: 711,550

[22] Filed: Sep. 10, 1996

[30]       Foreign Application Priority Data

Sep. 13, 1995   [JP]   Japan ...................................... 7-259502
Jun. 12, 1996   [JP]   Japan ...................................... 8-172935

[51] Int. Cl.[6] ...................................................... H04B 1/38
[52] U.S. Cl. .............................. 455/66; 455/575; 455/90; 455/568
[58] Field of Search .................................. 455/66, 88, 90, 455/463, 500, 503, 526, 575, 568, 507, 517, 351

[56]                References Cited

U.S. PATENT DOCUMENTS

| | | | |
|---|---|---|---|
| 3,845,389 | 10/1974 | Phillips et al. ........................... | 455/568 |
| 4,357,711 | 11/1982 | Drefko et al. ............................ | 455/575 |
| 5,113,428 | 5/1992 | Fitzgerald ................................ | 455/568 |
| 5,119,505 | 6/1992 | Tisseront et al. ........................ | 455/568 |
| 5,359,647 | 10/1994 | Regen et al. ............................. | 455/568 |
| 5,404,577 | 4/1995 | Zuckerman et al. ...................... | 455/66 |
| 5,438,702 | 8/1995 | Jackson ................................... | 455/575 |
| 5,586,176 | 12/1996 | Peck ........................................ | 455/568 |

*Primary Examiner*—Willis R. Wolfe
*Attorney, Agent, or Firm*—Morgan & Finnegan, LLP

[57]                ABSTRACT

A communication apparatus includes a plurality of transmitter-receivers operatively coupled together so that they are simultaneously communicatable over-the-air with one another by way of an interexchange repeater module, wherein one of such transmitter-receivers comes with a display device for providing information to the user, and a telephone connector for connecting the transmitter-receiver to the public telephone communication network. A sound-shielded headset is employed in the transmitter-receiver. This headset includes an audio input/output section with a microphone, speakers and the like, and a transmitter/receiver function section for executing signal processing tasks required for communications. Upon reception of a telephone signal, the transmitter-receiver is connected to the telephone connector by means of a cable-wiring, optical coupling or radio-wave coupling scheme providing voice communications with the outside parties. In case where the telephone connector is equipped with a known telephone set, voice communications will be available by entry of phone numbers over either external public lines or extension lines.

21 Claims, 11 Drawing Sheets

SIMULTANEOUS MULTIDIRECTIONAL COMMUNICATION APPARATUS

BACKGROUND OF THE INVENTION

1. Field of the Invention

This invention relates to telecommunication apparatus adaptable for use in noisy environments including furnace factories, sheet-metal or web production workplaces such as press-working, airplane setup/maintenance works in the airport, print/press factories, and the like, and, more particularly to voice communications apparatus capable of attaining successful transmission of voice messages and phone-calls under high noisy conditions.

2. Description of the Related Art

Conventionally, portable radiotelephones using a sound-shielded headset (sound-insulated transmitter-receiver) are employed as the communication means between workers under noisy conditions full of ambient noises. One exemplary apparatus for such sound-insulated transmitter-receiver is shown in FIG. 11. In this apparatus a plurality of transmitter-receiver 2 (21, 22, . . . , 2n) are operatively coupled over-the-air to one another using radio waves by way of a repeater 1. Any audio messages sent form the repeater 1 may be heard at all of the transmitter-receivers 2 providing simultaneous multidirectional communications. A battery-charge station 3 charges the batteries of respective transmitter-receivers.

Each transmitter-receiver 2 is provided with a headset of excellent sound insulation, which consists of a pad section, a support member and others. This headset is of the headphone type containing therein a microphone, a speaker(s), and a transmitter/receiver function section. Factory workers use such headphones by putting them on their heads to enable simultaneous multidirectional conversations to be carried out attaining required voice communications among them. The microphone detects ear-bone vibrations upon occurrence of a voice message and convert it into a corresponding electrical signal.

In the case where a telephone call is made in noisy environments of relatively higher noise level, it will possibly happen that the microphone also picks up the ambient sounds making it difficult for a worker to hear his or her aimed voice messages due to masking effects of background noises. Under such conditions, it is no longer easy for a worker to accurately transfer his or her voice messages; this necessitates a called party to answer back the caller for confirmation, wasting time and effort with the result in an increase in conversation time while reducing efficiency. One prior known approach for avoiding the problems is to install telephone booths of a sealed environment; another approach is to put each telephone set at a location of relatively low noise levels. Unfortunately, such approaches cannot always offer intended advantages on occasions where there are no such spaces wide enough to permit location of the telephone booth, or on occasions where such ideally low-noise places are not available within the factory. If this is the case, it is a must to put the telephones at noisy locations, which lacks the ability to provide any satisfiable conditions for workers to telecommunicate with each other.

Incidentally, there has been long desired a specific type of telephone handset suitably adaptable for use in voice communications in noisy environments namely, the one that can be directly installed under high noisy conditions and also attain clear conversations without having to be interfered with mixture of background noises with no interruptions in intended telecommunications. On the other hand, in the so-called "sound-insulated" transmitter-receivers for use in working under noisy conditions, successful results are only be achieved by employing workers' case-by-case procedures, which expect a worker who received a telephone call to i) use a selected telephone line being exclusively connected to the repeater, ii) catch the call using a transmitter-receiver that is presently in the out-of-busy state, or iii) ask his or her associate to separately connect with the calle. It will also occur that the called party must put his/her upper body or head into a sound-shielded box within the factory in order to hook up the telephone handset; it may alternatively occur that s/he has to go out of the factory to use one of remotely located telephones in calm areas outside the factory. The prior art sound-insulated transmitter-receivers are unable to insure direct telecommunications with external telephones as linked by way of the public telecommunication networks; accordingly, it will be inevitable for workers to interrupt their own works until completion of the present conversation between the caller and the called party over telephone, or to temporarily change the work to a different kind of one that may be done without the need of attendance of the calling or called worker. In any way, this should result in a decrease in efficiency of workability.

Under high noisy circumstances it is required that, upon occurrence of failures in working machines, such information be rapidly informed to workers so that necessary recovery/repairing procedures can be applied at the earliest convenience. One example is that when a paper quality inspection device (PQD) for inspection of printing machines or a spray dampener (SD) experiences failures accidentally, the resulting printing matter will be expressly lowered in quality causing the productivity to decrease significantly. To eliminate such reduction in productivity, rapid handling for recovery is strictly required at any events.

It is therefore an object of the present invention to provide a communications apparatus capable of retaining reliable communicationability with outside parties in situ under noisy circumstances by letting a repeater have a function of transferring information identical to any external signal inputs toward all of the transmitter-receivers operatively coupled therewith in the apparatus.

It is another object of the invention to provide a voice communications apparatus capable of allowing workers to call over telecommunication channels under noisy in-situ conditions by providing an extra function for enabling interconnectivity between sound-insulated transmitter/receivers and telephone connector devices.

It is yet another object of the invention to provide a voice communications apparatus capable of attaining conversations over public or extension telecommunication lines by entering telephone numbers on part of a telephone operation panel of a telephone connector device to ensure that workers can call a target party under noisy in-situ conditions without having to move far from their original working places during operations.

It is a still another object of the invention to provide voice communications apparatus capable of immediate start of conversations in situ over telephone upon reception of a telephone call while providing as needed the possibility of simultaneous multidirectional transmission/reception of oral messages among a plurality of transmitter-receiver users concerned, to thereby suppress or eliminate degradation of efficiency otherwise occurring when a worker must move far from his or her working place for telephone calls.

It is a further object of the invention to provide a telecommunications apparatus capable of retaining security for covert conversations while preventing leakage of information content to other transmitter-receivers by forcing upon receipt of a telephone call a communication function to be interrupted between the transmitter-receiver of a called party and other transmitter-receivers, and also capable of maintaining mutual communication functions among the other transmitter-receivers to allow these transmitter-receivers to continuously remain active in telecommunications among them thus eliminating any possible interruptions in execution of works required.

It is a yet further object of the invention to provide a telecommunications apparatus capable of allowing telephone responses and call-up of a target party to be smoothly carried out by use of a specific kind of sound and/or visual indication scheme to inform the target person of the presence of a telephone call.

SUMMARY OF THE INVENTION

The present invention has been made to avoid the aforesaid problems and to achieve the foregoing objects.

A communications apparatus of the invention has a repeater, and a plurality of transmitter-receiver operatively coupled to be simultaneously radiocommunicatable with one another multidirectionally by way of the repeater, wherein a sound-shielded headset is adapted in one or more transmitter-receivers, including an audio input/output (I/O) section with a microphone and speaker, and a communication means containing therein a transmitter/receiver function section for execution of signal processing required for communications and being held at or near a human body for handheld use, featured by comprising an informing means for providing necessary information to a user of a transmitter-receiver operatively coupled to the repeater which transmits information corresponding to an external signal input to all the transmitter-receivers by way of the informing means.

In accordance with the invention, due to the use of the repeater with the function of transmitting information indicative of an external signal input toward all the transmitter-receivers, it is possible even in high noisy environments to provide transmitter-receiver users with information identical to the external signal input, such as notices, broadcast messages, background music, acknowledgement, warning, or the like, thus enabling the workability to be enhanced in the communications apparatus.

The communications apparatus of the invention may preferably be arranged as follows:

(1) An external signal input is a telephone receipt signal, and the repeater is responsive to such signal for causing the informing means to inform all the transmitter-receivers of the reception of a call.

(2) The external signal input may be a signal representative of occurrence of abnormal operations, a warning signal or the like as in the machinery equipment used.

(3) The external signal input may alternatively be an audio signal such as a human language, notices, broadcast messages, background music, alike.

(4) A transmitter-receiver and its associated telephone connector device are coupled together by a cord coupling, radio communication, or optical communication scheme.

(5) The informing means includes a means for sending forth sounds to all the transmitter-receivers while employing as an informing sound of telephone reception a specific kind of sound identically distinct from other warning signals (6) The informing means includes a means for sending forth sounds to all the transmitter-receivers and/or a display means, wherein informing of telephone reception or abnormality warning in the machinery equipment is done using sounds and/or visual indications.

(7) The repeater comes with a communication section for enabling the owner of a telephone connected with the telephone line to telecommunicate with one or a plurality of transmitter-receiver users by way of the repeater.

(8) Each transmitter-receiver includes a means for causing the communication functions to break off between it and other transmitter-receivers when connected to the telephone connector device, and a means for resetting the communication functions therebetween by disconnecting the connection with the telephone connector.

(9) The repeater has a communication retaining function of enabling, when one transmitter-receiver is coupled to the telephone connector, communications among the other transmitter-receivers.

(10) The display means includes an indication lamp that turns on for acknowledgement upon reception of a telephone call or of warning signals in the machinery equipment.

The sound-shielded headset as preferably used in the communications apparatus is arranged as follows:

(1) The headset has a sound-shielded structure, and comprises a communication means which is held at or near a human body for mobile use and which comes with an audio I/O section including a microphone and speaker, and a transmitter-receiver function section for performing signal processings required for communications, wherein voice communications are available by causing the communication means to be operatively coupled to the telephone connector by use of a telephone cord-coupling unit, an optical transmit-and-receive scheme, or a radiocommunication scheme.

(2) The transmitter-receiver function section of the communication means includes a first transmitter/receiver function section for processing signals with respect to the audio I/O, and a second transmitter/receiver function section for performing signal processings between it and the first section and those between the telephone connector and the repeater, wherein the first section is in a attachment means attached to selected positions of a human body involving auditory sensible organs, whereas the second section is at or near the human body for mobile use.

DETAILED DESCRIPTION OF THE PREFERRED EMBODIMENTS

An arrangement of the invention will be defined as follows. The terminology "sound shield" means lowering ambient noises to a degree that there are no substantial interferences with voice communications. The "headset" is constituted from a pair of earpads or ear-muff entirely covering the ear of the use—or alternatively, an earplug adapted to be inserted thereinto and a communication means attached to and held at or near a human body. The communication means includes an audio input/output (I/O) section having a microphone and speaker, and a transmitter/receiver function section for performing signal processing tasks as required for voice communications.

Figure 11:
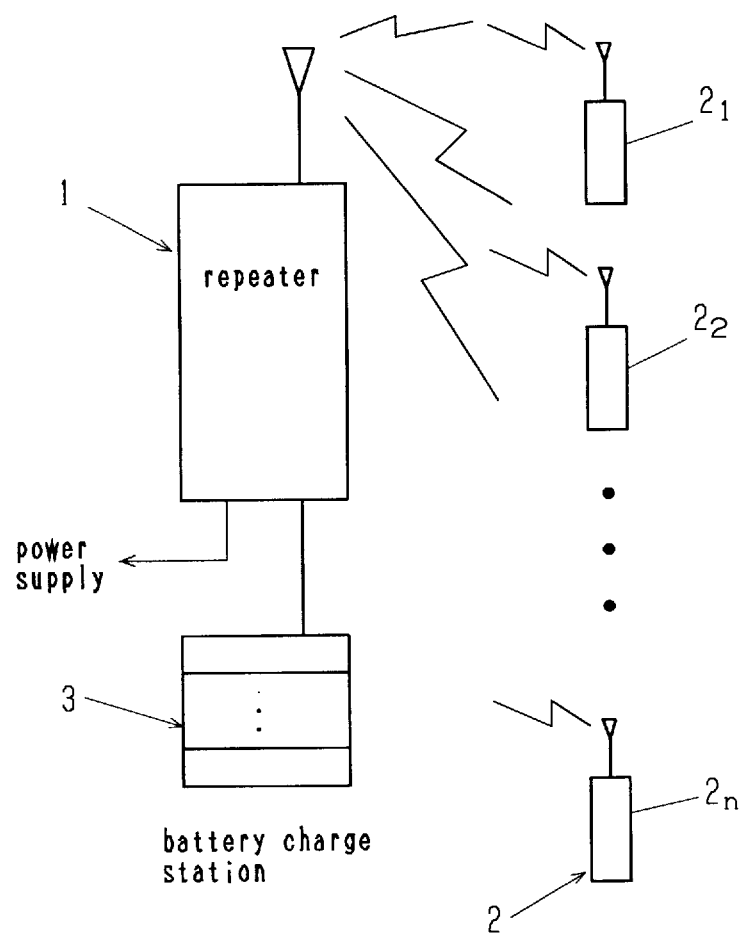
FIG. 11 is a diagram showing a apparatus configuration of one prior art transmitter-receiver.

The illustrative embodiments are arranged such that a repeater is added with external-input functions of receiving several signals externally fed thereto, including telephone signals, equipment failure occurrence signals, voice messages such as reports or acknowledgement, background music (BGM) audio signals, or the like. For example, when an external cable broadcasting program source is employed as BGM, a cable broadcast receiver is tied to an external signal input terminal. Note that the voice communications apparatus of the invention is generally similar in basic apparatus configuration to the prior art apparatus shown in FIG. 11. Hence, only distinguishing features of this invention will be described herein: Like reference characters designate like parts or components, and a detailed explanation thereof will be omitted.

Figure 1:
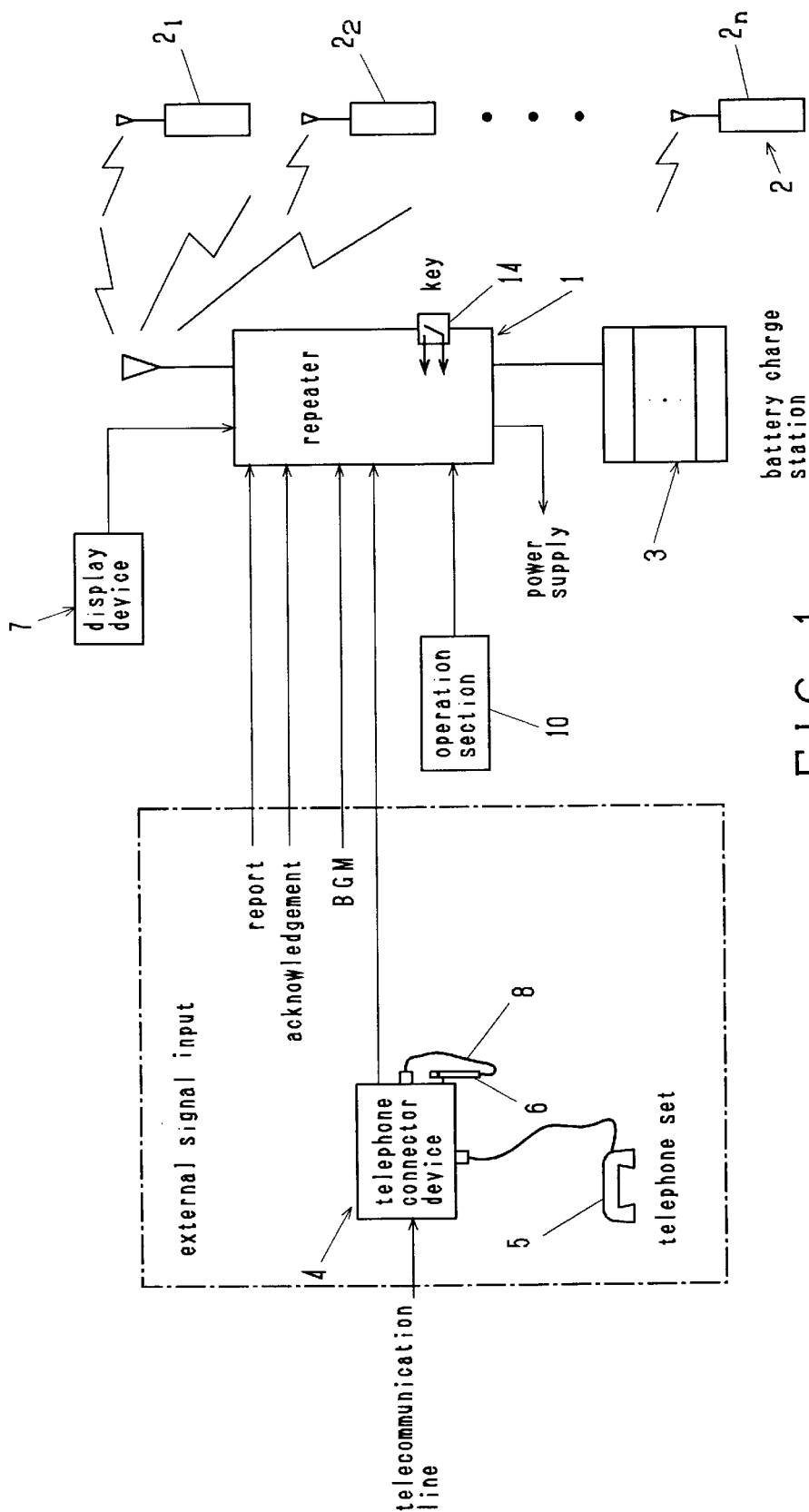
FIG. 1 is a drawing showing a configuration of a voice communications apparatus in accordance with a first embodiment of the invention.

FIG. 1 shows a apparatus configuration of a first embodiment of the invention. This embodiment enables at least one of transmission and reception units (portable radiotelephone or transmitter-receivers) 2 to be coupled by a cable to a telephone connector device 4 when used for telecommunications. A repeater 1 is designed, in addition to its inherent interexchange and repeat functions, to perform external signal input detection for selecting a specific external input signals being received by the voice communications apparatus in response to entry of keying input and/or of a password. The repeater 1 is also responsive to a telephone reception signal from the telephone connector device 4 connected to the external signal inputs, for carrying out voice message handling procedures as required to transmit a specific audible sound that distinguishes from others a sound for use in warning or reporting. The repeater 1 informs all of the transmitter-receivers of such telephone reception by use of the specific sound upon reception of a telephone call from the outside, and simultaneously causes a display device 7 to perform visual indications for informing that a telephone call is being presently received. Here, the specific sound generation section and display device constitutes such informing device, which is also capable of attaining informing functions for warning or reporting as to factory equipment concerned. To produce a signal indicative of whether the reception of external signal input is permissible or not, an arrangement is additionally provided which may be a key section 14 consisting of a combination of mechanical dataentry keys and switches, or of a combination of such mechanical keys and an operation section 10 for password entry.

The telephone connector device 4 functions to connect the public telephone line (TEL) to the repeater 1, and acts as either a telephone set consisting of a known telephone handset 5 or a telephone set that utilizes one transmitter-receiver as its handset. This device 4 also has a telephone interconnection function that sends forth a telephone reception signal upon reception of a call at a telephone set (external line) using public telecommunication networks owned by a telephone company or at a telephone set (extension) using its own telephone network by way of none of the telephone company's public networks, and which connects it to either the telephone handset 5 or transmitter-receiver 2 of a target user—namely, the calling or called party. The telephone connector 4 also comes with a cable 8 having a transmitter-receiver connection connector 6 as a means for connecting it to the transmitter-receiver 2. The connector 6 is engageable by a hook with the main body of device 4; while the telephone is in use, this connector is taken out of the hook to be connected to transmitter-receiver 2 enabling voice communications with a target person.

Figure 2:
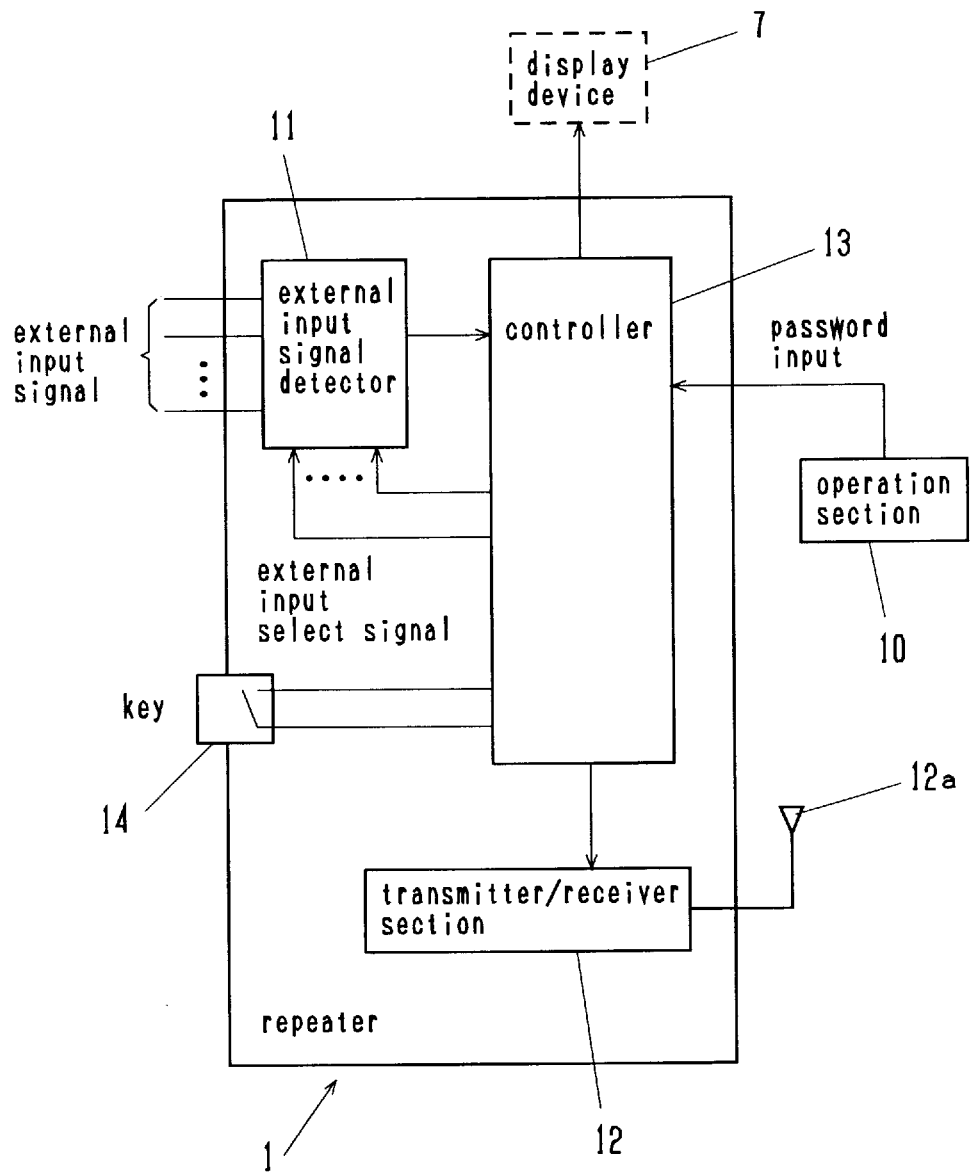
FIG. 2 is a block diagram of the repeater.

As shown in FIG. 2, the repeater 1 is constituted from an external signal input detector 11, a transmitter/receiver (TX/RX) section 12, a controller 13, and a key section 14. The detector 11 serves to detect an external input signal(s). When detector 11 detects any external input signal, TX/RX 12 processes signals as to reporting and warning tasks required for all of the transmitter-receivers 2 and then transmits over-the-air the resulting signals from an antenna 12a, while also performing display processings for warning indication to render the display device 7 operative. Repeater 1 has also a function of selecting interconnection of external signal inputs in response to key inputs and/or password inputs. To achieve this function, a key signal and/or a password signal may be input to controller 13. Some apparatus may be employed to provide such external signal inputs: in PQD, a apparatus is employed to detect occurrence of printing failure or malfunction; in SD, a apparatus is used to issue warning upon occurrence of interruption of water feed, shortage of dampening water, or reduction of water pressure. Repeater 1 is arranged to indirectly detect such warning by use of either an light or a radio transmission scheme; alternatively, a relay switch circuit is provided in each device allowing the repeater to be directly tied to such relay switch circuit.

The external signal input detector 11 is responsive to a select signal sent from the controller 13 for selection of a certain external signal input corresponding to a key input and/or a password input fed from controller 13, and extracts from those external signal inputs a specific one that matches with the voice communications apparatus, causing it to be coupled thereto. More specifically, in order to protect the communications apparatus against accidental operational interruption or significant decrease in performance due to inbound of "strange" external signal inputs that are out of the protocols as employed in the communications apparatus, the external signal input detector 11 has a locking function for exclusively receiving appropriate "welcome" external signal inputs with predefined specifications, and a lock-release function for resetting the locking function. To attain these functions, a mechanical key is connected to a contact of a switch, whereas a circuit connected to an input terminal of the repeater (this terminal is for taking a signal externally input thereto into the external signal input detector) is selectively set in the connect or in the nonconnect state. Another approach to attain the above functions is that a mechanical key is designed to cooperate with password inputs while similarly setting the circuit in the connect or the nonconnect state.

Figure 3:
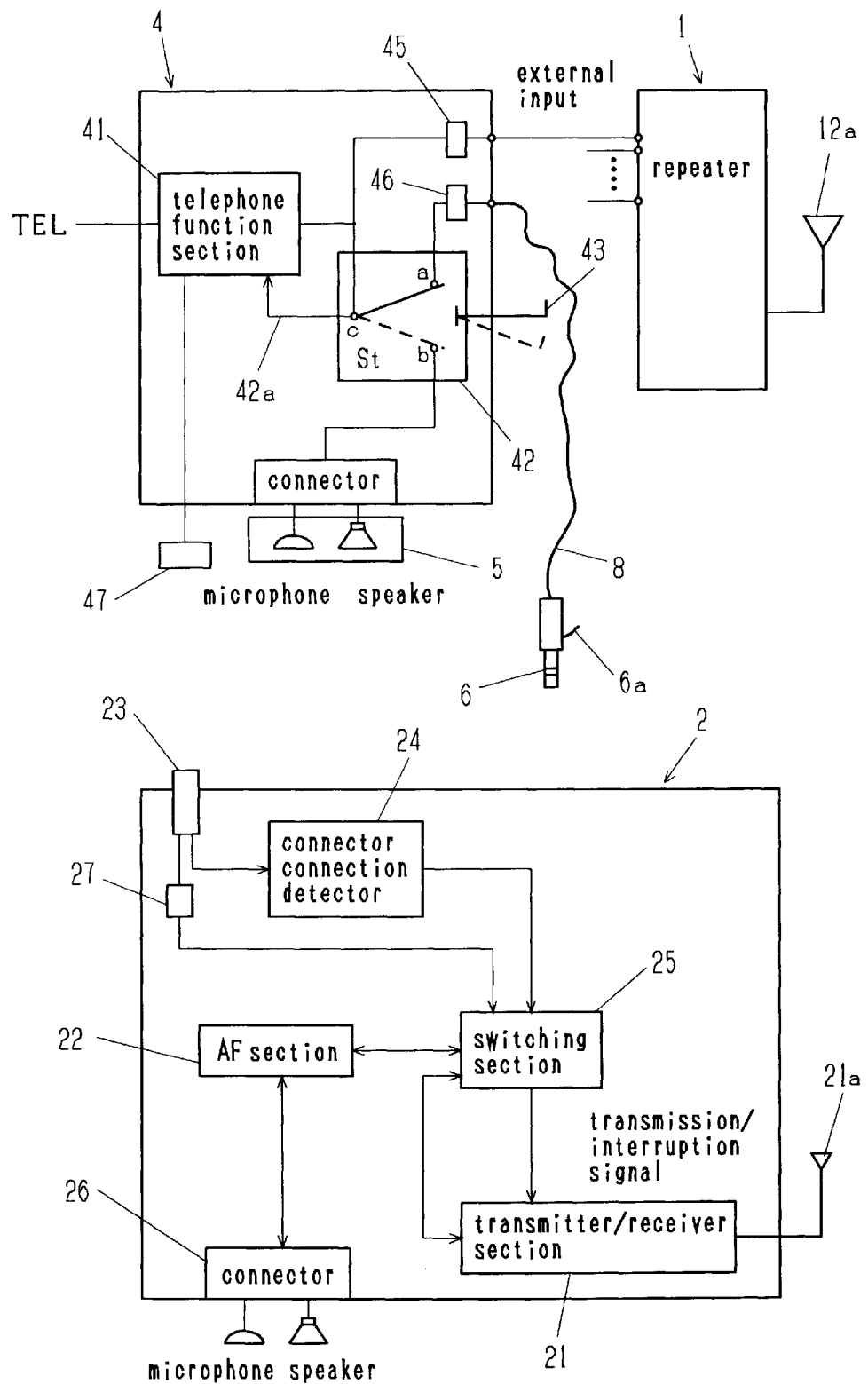
FIG. 3 is an overall block diagram.

As shown in FIG. 3, the telephone connector 4 is generally constituted from a telephone function section 41 for enabling it to be used also as an ordinary telephone, a changeover switch (St) 42 acting as a changeover means for changing over the signal transmission line between telephone 5 and transmitter-receivers 2, a hook 43 as an operation means for operating switch 42, a cable 8 having a transmitter-receiver connection connector 6 that is normally hung on hook 43, and buffer sections 45, 46 for waveshaping respective signals, one of which is inserted between telephone function section 41 and repeater 1, and the other of which is between section 41 and transmitter-receivers 2 as shown. The buffer 46 is connected to the telephone function section 41 by way of a fixed contact a and a common contact c of the changeover switch St.

The switch 42 consists of a toggle switch mechanism with the hook 43 being as its operation lever. As indicated by solid line in FIG. 3, when the connector 6 is out of hook 43, the common contact c of switch St is connected to one fixed contact a causing transmitter-receiver 2 to be operatively coupled with telephone function section 41 of telephone connector device 4 so that telecommunications are available. When connector 6 is put on hook 43, the common contact c is alternatively connected to the other fixed contact b as designated by broken line in FIG. 3 causing telephone function section 41 to be operatively coupled to telephone handset 5 allowing device 4 being able to operate as an ordinary telephone.

Upon reception of a telephone call, once the connector 6 is disconnected from the hook 43, the operation signal (unlock signal) is supplied from the changeover switch 42 to the telephone function section 41 through a signal transmission line 42a. In response to this signal, a hold switch 47 is rendered operative. The "hold" function is to hold the telephone line active while a target person comes here after being called up by a worker who first responded to the telephone call, even if connector 6 is returned to hook 43. Telephone handset 5 and connector 48 constitute a telephone voice I/O section. Note that hold switch 47 is for temporarily interrupting telecommunications, which is similar to the hold function of known telephones. The telephone function section 41 has configuration and functions of conventional telephones.

The transmitter-receiver 2 of FIG. 3 includes a TX/RX section 21, an AF section 22 for amplifying a reception signal processed by TX/RX 21 and audio/voice signals input from the microphone, a connector 23 for connection between transmitter-receiver 2 and telephone connector device 4 by way of cable 8, a connector connection detector 24 for detecting the actual connection between transmitter-receiver 2 and telephone connector device 4 by way of cable 8, a switching section 25 responsive to the signal from detector 24 for changing over the line between transmitter-receiver 2 and the telephone, and an audio I/O section which includes a microphone, a speaker and a connector section 26. TX/RX 21 renders the communication function active or inactive that is, recover or interrupt selectively. The recovery of communication function is to let the transmission operation get started in response to a transmission enable signal as sent from switching section 25; the interruption of communication function is to cause the transmission to stop in response to a transmission disenable signal. Additionally, numeral "27" designates a buffer section similar in function to that 46 of telephone connector device 4.

Figure 4:
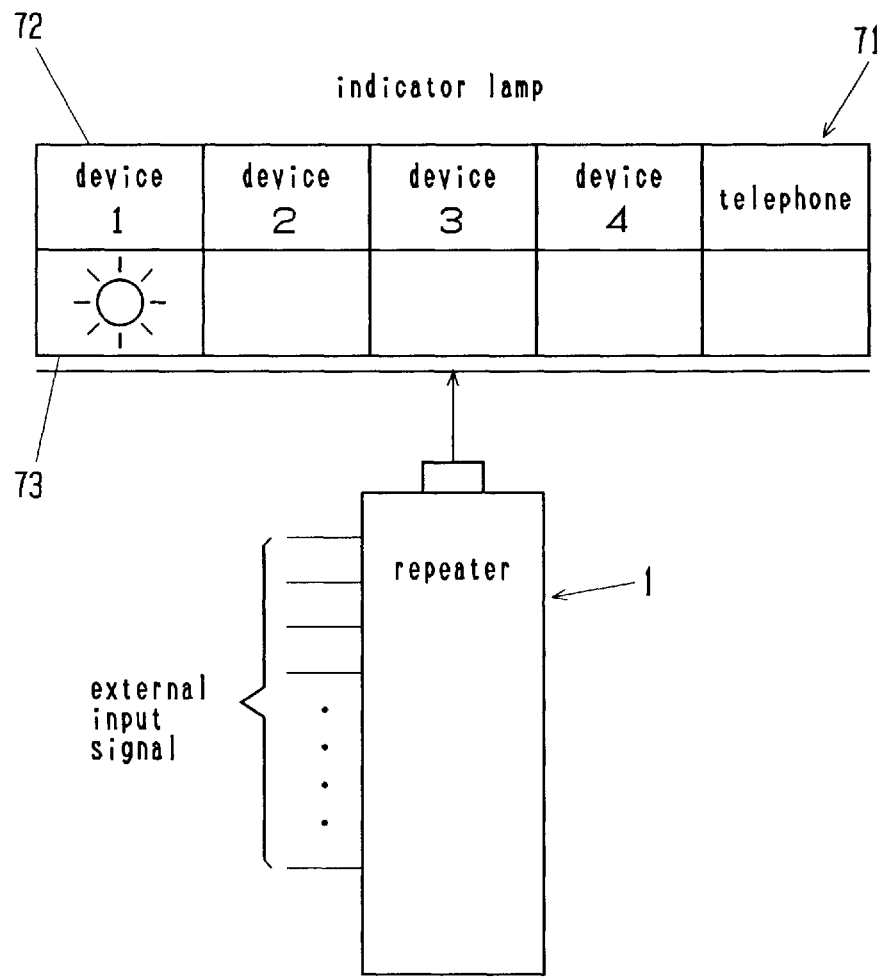
FIG. 4 is a diagram showing an arrangement of an indicator lamp unit as one exemplary display device.

As shown in FIG. 4, the display device 7 may include an indicator lamp unit 71. This unit may be located at a selected position that facilitates workers' visual acknowledgement during execution of their expected works. Lamp unit 71 has at the upper position thereof an array of telephone labels 72 with characters that indicate devices #1 to #4 and one telephone as objects being monitored; unit 71 also has at its lower position an array of a corresponding number of lamps 73 as shown. Lamp unit 71 carries out light turn-on operations under the control of controller 13 of repeater 1 in accordance with an external signal input as detected by detector 11. Especially, regarding the device #1 to #4, lamp unit 71 is arranged to inform workers of occurrence of device failures. Accordingly, workers can figure out, by visually checking the light turn-on position after hearing sounds, which one of the devices #1 to #4 and the telephone is presently subject to acknowledgement, warning or report.

Figure 5:
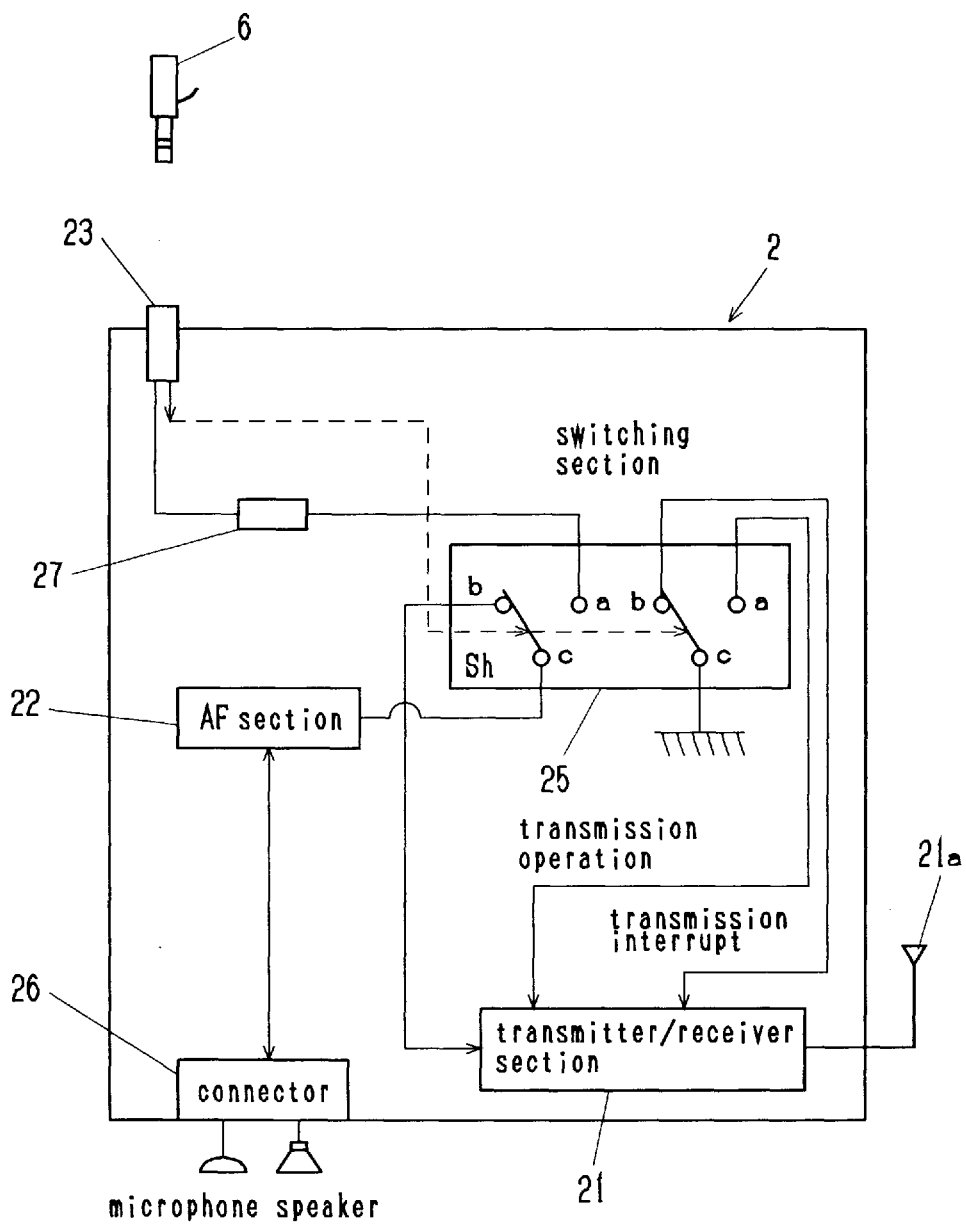
FIG. 5 is a block diagram showing an exemplary switch unit for changeover between a transmitter-receiver and a telephone.

One exemplary arrangement will now be discussed with reference to FIG. 5, which detects actual connection between transmitter-receiver 2 and telephone connector 4 to switch from the transmitter-receiver to the telephone.

This example employs as its switching section a changeover switch (Sh) 25 with a mechanical switch assembly. Switch 25 switches from one fixed contact b to the other a in response to insertion of the connector 6 of telephone connector device 4 into connector 23. When connector 6 is out of connector 23, switch 25 automatically recovers at the fixed contact b. Switch 25 includes a two-circuit/two-contact switch mechanism. A first switch circuit changes over between the telephone and transmitter-receiver. In the first switch circuit an audio I/O is connected to common contact c through AF section 22. Connector 23 is connected to fixed contact a through buffer 27. Contact b is connected to an I/O terminal of TX/RX 21.

A second switch circuit is for changing over the operation mode of transmitter-receiver 2 between the transmit-activation and interruption. This circuit has a pair of fixed contacts a, b connected to TX/RX 21, and a common contact c coupled to ground. To let the transmission get started or interrupt in responding to an input signal from switch Sh, the TX/RX 21 is arranged as follows: it interrupts transmission when the fixed contact a is grounded (Low: L signal) while the fixed contact b is open (High: H signal); it allows transmission to get started when contact a is at the H signal while contact b is at the L signal. The audio I/O is connected to TX/RX 21 in response to initiation of the transmission operation. During the transmission operation, an antenna 21a externally sends forth over-the-air corresponding electromagnetic waves; this antenna may also catch radio waves from other transmitter-receivers so that it may function as a simultaneous multidirectional communicatable transmitter-receiver. Additionally, the changeover processor is not exclusively limited to the switch Sh; it may alternatively be a contactless switch known as the electronic switch.

The voice communications apparatus operates as follows. The telephone connector device 4 is normally switched to the side of telephone handset 5 as the connector 6 is put on hook 43. When a telephone call is required over external public telecommunication lines or extensions thereof, handset 5 is picked up; after entry of a desired telephone number on the telephone operation panel, the telephone function section 41 of device 4 is operative rendering it active for telecommunications. Upon reception of a telephone call over either the public line or the extension, this is noticed from device 4 to repeater 1. When external signal input detector 11 detects that the presently received calling is a telephone call, repeater 1 causes a corresponding indicator lamp to turn on emitting light, and simultaneously informs all of the transmitter-receivers 2 (21, 22, . . . , 2n of FIG. 1) of such state by providing an informative sound thereto. A person who first responded to the call makes use of the transmitter/receiver function to try to acknowledge a target person by speaking and calling up the person. In responding, s/he (called party) inserts the connector 6 of telephone connector device 4 into the connector of his or her own headset to establish electrical connection therebetween.

Connection between the telephone connector 4 and the transmitter-receiver of the target person being called enables his or her communications with the caller. At this time, the communication function of the target person's transmitter-receiver is forced to interrupt making it unable for all persons but the called party (the remaining transmitter-receivers) to hear the conversation content. Simultaneously, since mutual telecommunication functions remain still active among the remaining transmitter-receivers, any voice communications are available between any ones of the remaining transmitter-receivers without any inconveniences. After completion of the talking over phone between the caller and called party, s/he disconnects connector 6 from the headset causing telephone connector device 4 to be in the normal state shown in FIG. 1, in which the transmitter-receiver returns to its initial state where it functions as a transmitter-receiver.

In the first embodiment there has been described the apparatus which is arranged to achieve acknowledgement of recipt of a telephone call by use of both visual indication of light at an indicator lamp and acoustic sensation using sounds; however, it may alternatively be modified so that such acknowledgement is accomplished by exclusive use of a specific kind of sound, involving a characteristic sound that enables workers to audibly recognize reception of a telephone call, such as electronically synthesized call-up voice. It is also possible to more reliably inform a target person of such reception of a telephone call by use of a flashing light.

Further, while the embodiment has been described based on the arrangement in which the telephone connector 4 comes with a single transmitter-receiver connector 6, such device may alternatively be provided with a plurality of transmitter-receiver connectors enabling a corresponding number of transmitter-receivers to remain connectable therewith. In this case, the telephone connector is increased in impedance accordingly.

Figure 6:
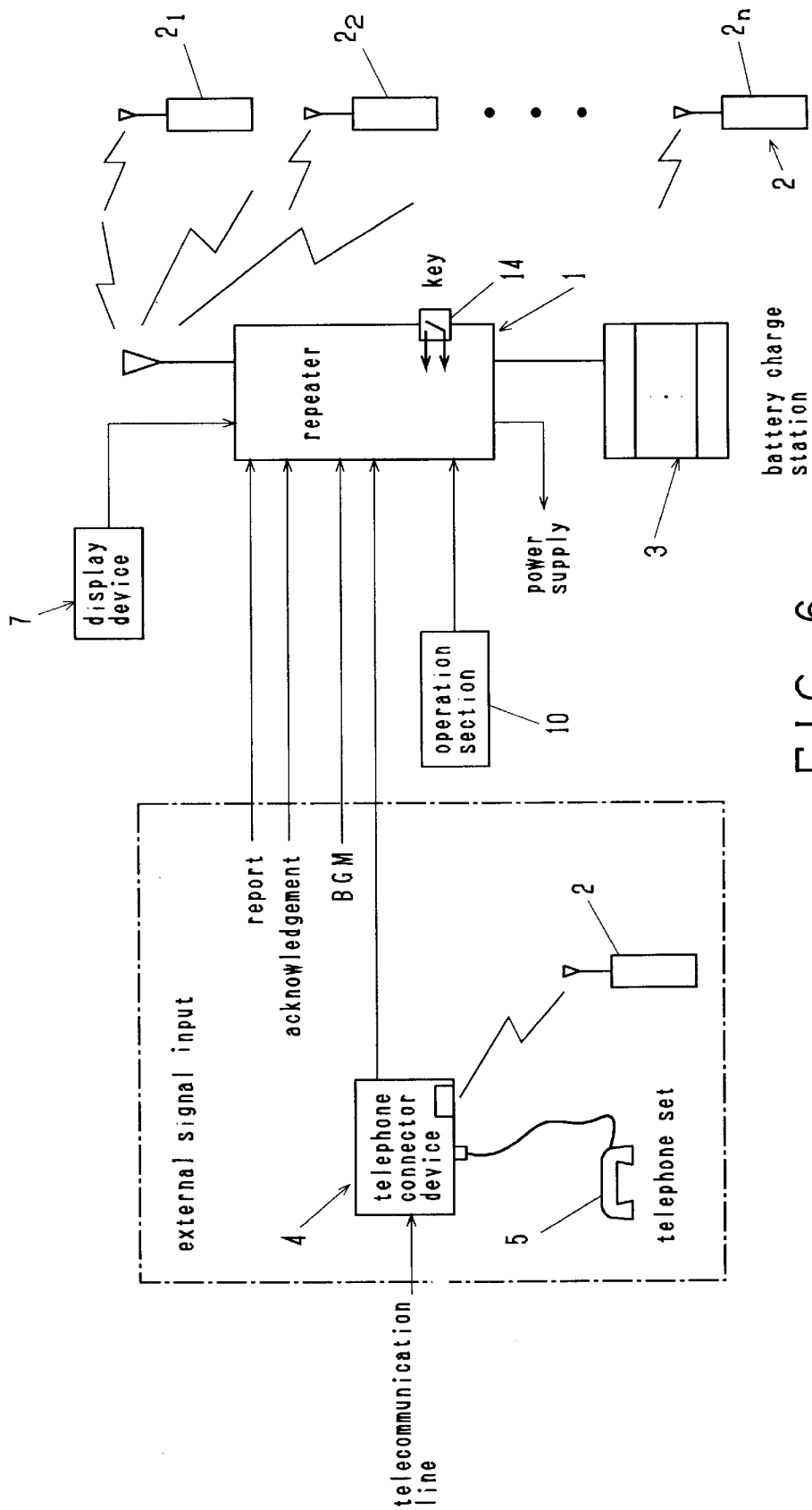
FIG. 6 is a diagram showing a configuration of a second embodiment of the invention.

A apparatus configuration of a second embodiment of the invention is shown in FIG. 6. This embodiment employs one of the optical communication scheme and the wireless communication scheme to allow the telephone connector device 4 to be operatively coupled to transmitter-receiver 2. The illustrative apparatus of FIG. 6 is similar in arrangement to that shown in FIG. 1 with the telephone cord for connection between the transmitter-receiver 2 and telephone connector device 4 being replaced by one of an optical communication using infrared (IR) light and wireless communication using radio frequency (RF), for example. A apparatus configuration using the optical scheme is shown in FIG. 7, wherein like reference characters designate like parts or components, and a detailed description thereof will be omitted herein.

Figure 7:
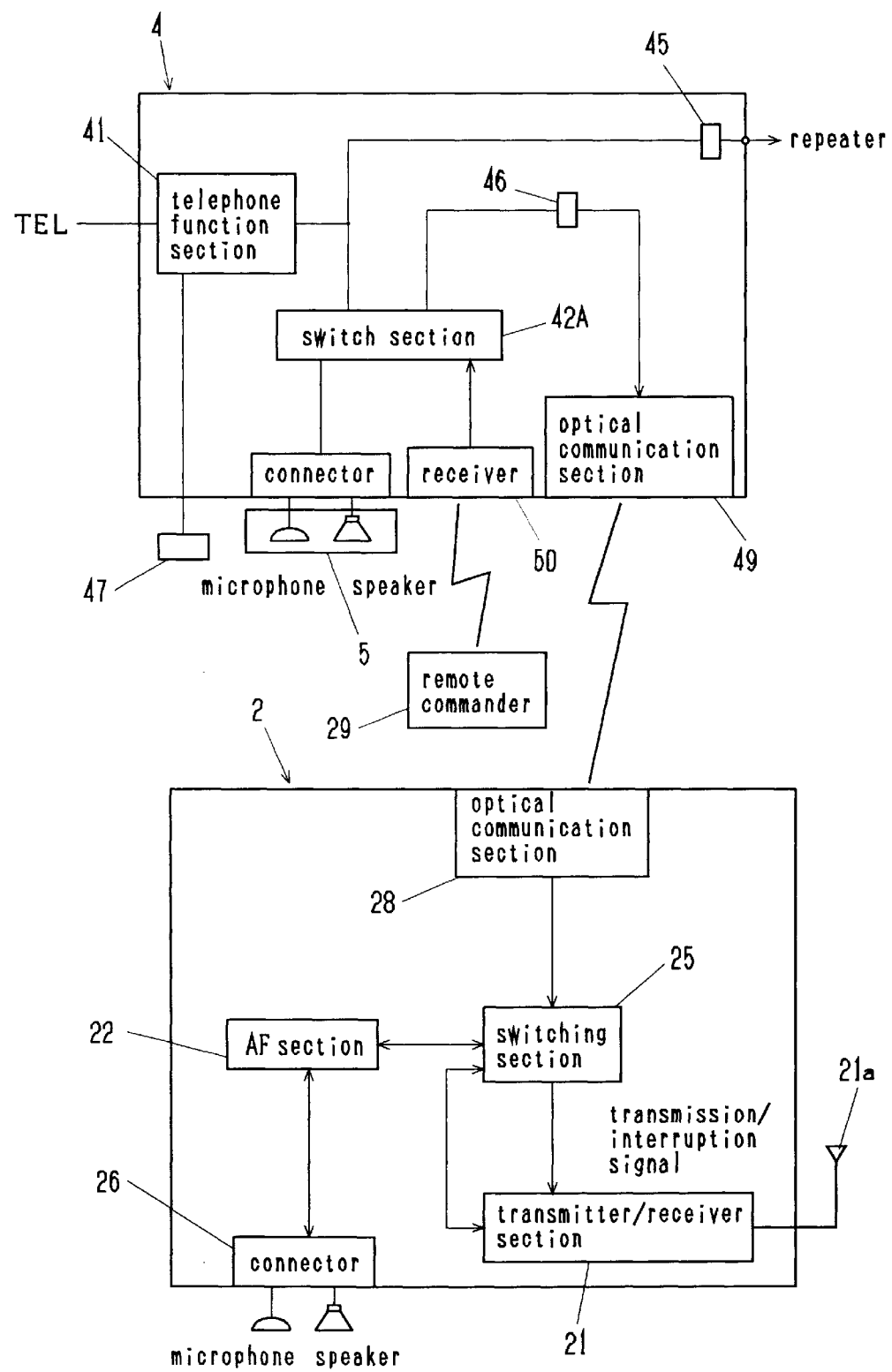
FIG. 7 is a block diagram of a telephone connector and a transmitter-receiver using an optical communication scheme.

As shown in FIG. 7, the telephone connector device 4 is includes a telephone function section 41, a switching section 42A, an optical communication section 49, and an audio I/O section. When telephone function section 41 is connected by the switching section 42A to telephone handset 5, the telephone function becomes available using handset 5; alternatively, when section 41 is connected to optical communication section 49, the telephone function is established using the transmitter-receiver. Switching section 42A is normally connected to handset 5; it is changed over by manual operation of a remote controller or commander 29 by a target person who is expected to respond to the caller. The remote commander 29 may have a transmitter including therein an IR emission element: it emits a first signal in response to user's manual operation such as depressing a key button. This first signal travels over-the-air toward a receiver 50 including an IR sensor. This receiver is responsive to receipt of the first signal for rendering the switching section operative so as to disconnect handset 5 from switching section 42A while causing optical communication section 49 to be connected to telephone function section 41. When an additive manual operation is done such as depressing the button of remote commander 29, it emits a second signal for causing the switching section 42A to be switched to the side of handset 5.

The transmitter-receiver 2 includes a TX/RX section 21, a switching section 25, an optical communication section 28, and an audio I/O section. When the optical communication section 28 receives optical emission from the optical communication section 49 in telephone connector device 4, the switching section 25 then connects the audio I/O section to optical communication section 28, and supplies a transmission interrupt signal to TX/RX 21. When optical communication section 28 receives information representative of the fact that the telephone is cut off, switching section 25 provides TX/RX 21 with a transmission enable signal while causing the audio I/O to be operatively coupled to TX/RX 21. The operation of TX/RX 21 is as follows: when the transmission interrupt signal is input from switching section 25, it interrupts any communication functions with respect to other transmitter-receivers; when the transmission enable signal is input, TX/RX 21 recovers the communication functions. Note that an optical cable may alternatively be used in the case where transmitter-receiver 2 and telephone connector 4 are optically coupled to each other.

Figure 8:
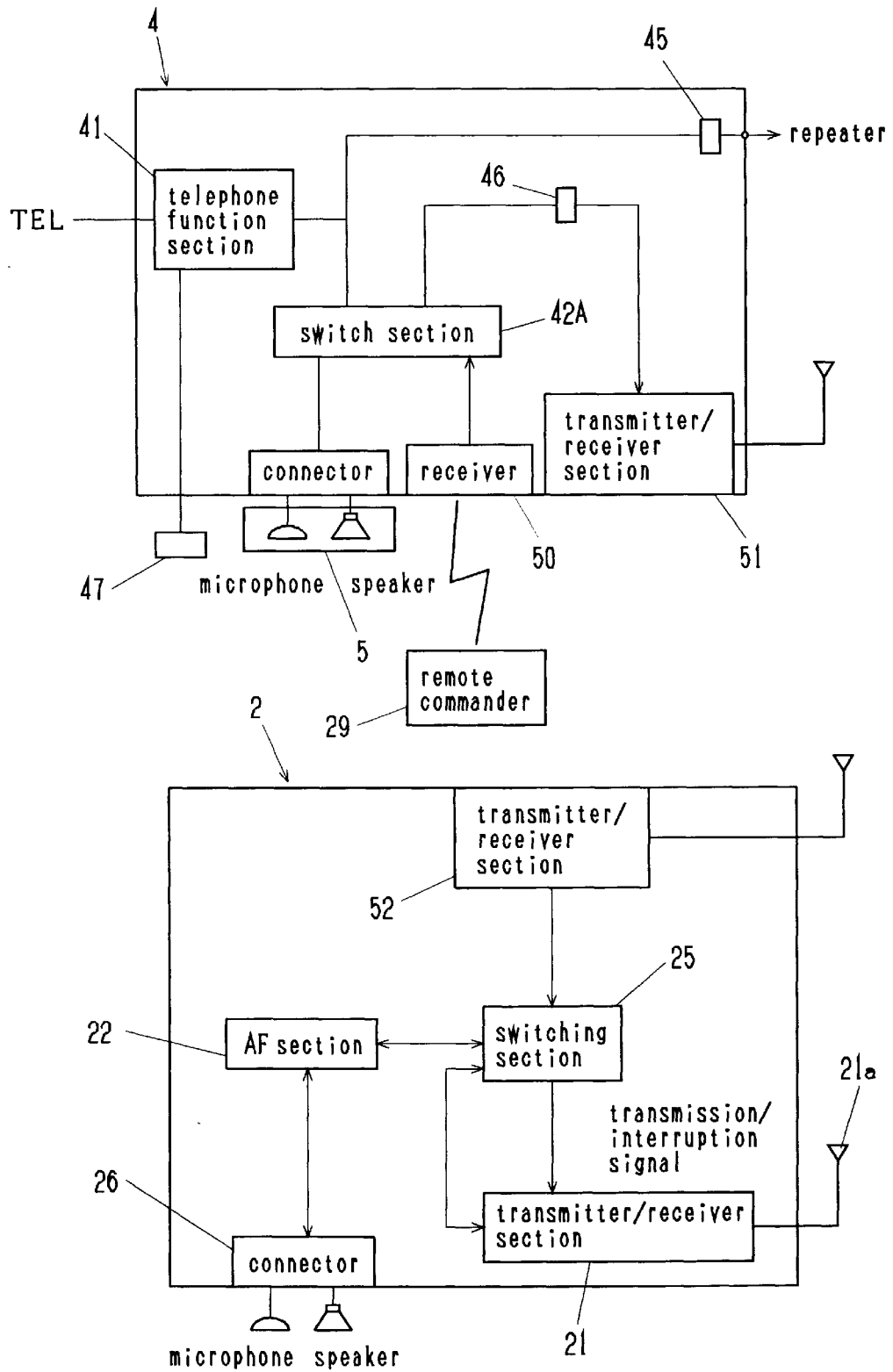
FIG. 8 is a block diagram of a telephone connector device and a transmitter-receiver using a radio transmit-and-receive technique.

A apparatus configuration using the radiocommunication scheme is shown in FIG. 8. This apparatus is similar to that of FIG. 7 with the optical communication sections 28, 49 being replaced with radio TX/RX sections 51, 52. More specifically, this apparatus uses these TX/RXs 51, 52 to attain wireless communications between TX/RX 2 and telephone connector device 4.

An advantage of the second embodiment is that the useability and workability can be further enhanced in such a manner that the called party can use the phone namely, responding and calling over telephone without having to come to the exact phone place or a nearby place, which in turn enhances the efficiency of handling the same.

Figure 9:
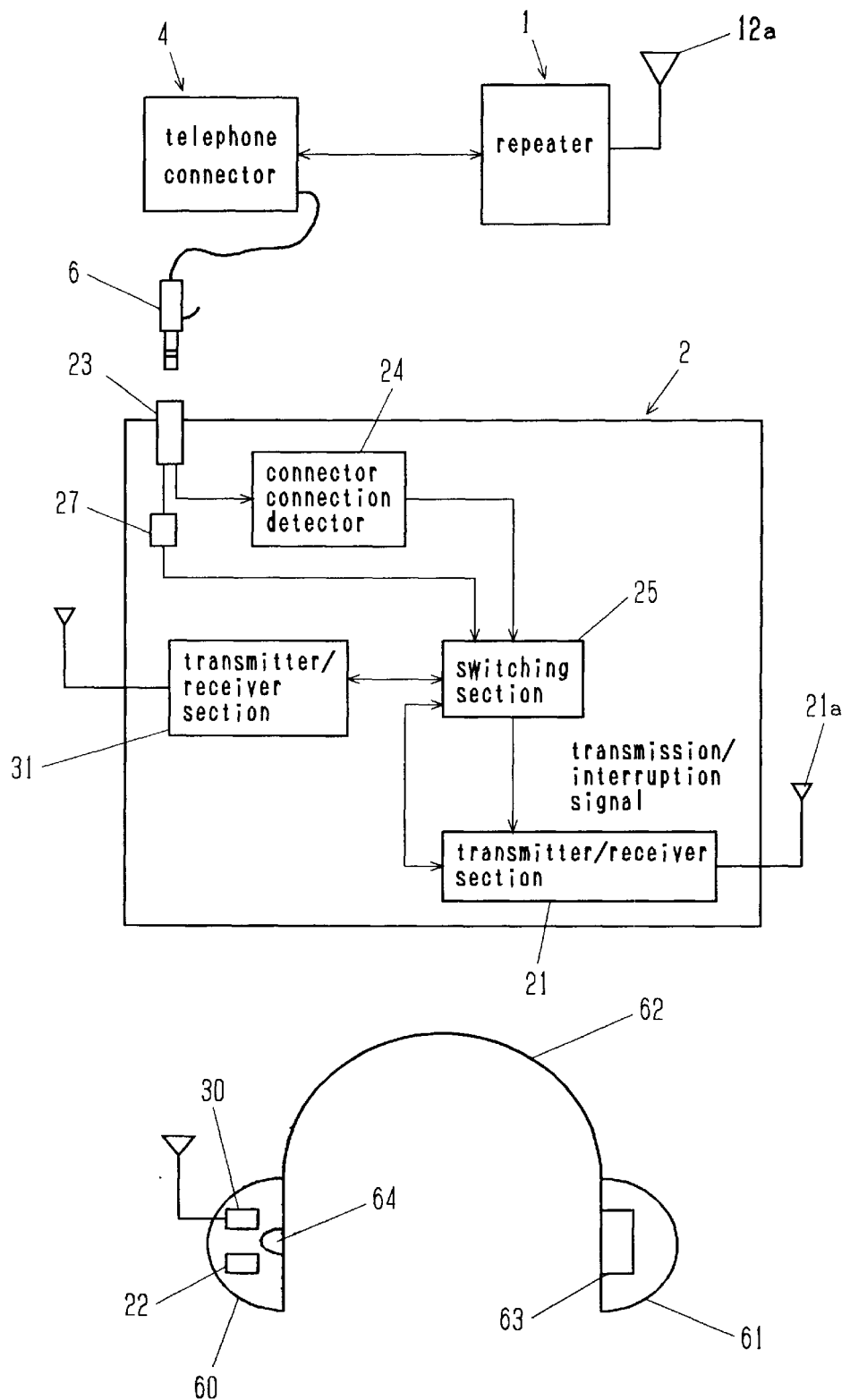
FIG. 9 is a apparatus configuration diagram showing one possible modification of the second embodiment.

An embodiment shown in FIG. 9 is such that part of the communication means of the transmitter-receiver is held near the headset. This embodiment is similar to the first embodiment in arrangement concerning the connection between the telephone connector and the transmitter-receiver. This embodiment features in that the audio I/O and wireless TX/RX section of the communication means are attached at or near the headset. An intended technical significance of such arrangement lies in that part of the communication means is built in an earmuff, or incorporated into a headband coupled thereto.

In FIG. 9 the headset has earmuffs 60, 61 coupled together by a head band 62. One muff 60 contains therein a speaker 63, whereas the other muff 61 includes a microphone 64. The muff 61 with microphone 64 also contains an AF section 22 for signal-processings with respect to audio/voice inputs from the microphone and audio/voice outputs of the speaker, and a wireless TX/RX section 30 for causing signals to be transmitted over-the-air to or received from transmitter-receiver 2. Switching section 25 provides controls for operating TX/RX 21 in accordance with the actual connection state between transmitter-receiver 2 and telephone connector device 4, or for temporarily interrupting transmission operations. When transmitter-receiver 2 is cable-connected by way of connector 6 to device 4, the resulting connection state is detected by detector 24. Upon receipt of a connection detection signal from detector 24, swithing section 25 generates and issues a transmission enable signal which is fed to TX/RX 21. Upon receipt of a transmission disenable signal from switching section 25, TX/RX 21 attempts to interrupt the transmission operation toward repeater 1. With this operation, the so-called secret speaking or "covert" function is available that is, a selected person who owns transmitter-receiver 2 operatively coupled to telephone connector device 4 can exclusively be allowed to carry out conversations over phone. When the connection between transmitter-receiver 2 and device 4 is released, the resultant state is detected by detector 24. Processor 25 supplies a transmission enable signal to TX/RX 21. In response to this signal, TX/RX 21 initiates transmission operations. Due to this, the TX/RX that has been used for telephone is now set in a mode that enables telecommunications with any one(s) of the other transmitter-receivers.

Note that a transmitter/receiver function section of the communication means includes a first transmitter/receiver function unit consisting of a TX/RX 30, and a second transmitter/receiver function unit consisting of a TX/RX 21, a connector connection detector 24, a changeover section 24 and a TX/RX 31. The first unit is arranged at a component being attached to the auditory parts of human body, such as the earmuff, for example. The second unit is held at a selected position near the human body excluding the acoustic sensible part thereof; for example, it is put in a pocket, or attached to a band.

This embodiment is generally similar in operation to the first embodiment, except that the communication means is held near the headset and that communications between this communication means and the transmitter-receiver is performed using wireless telecommunication schemes using radio waves.

Figure 10:
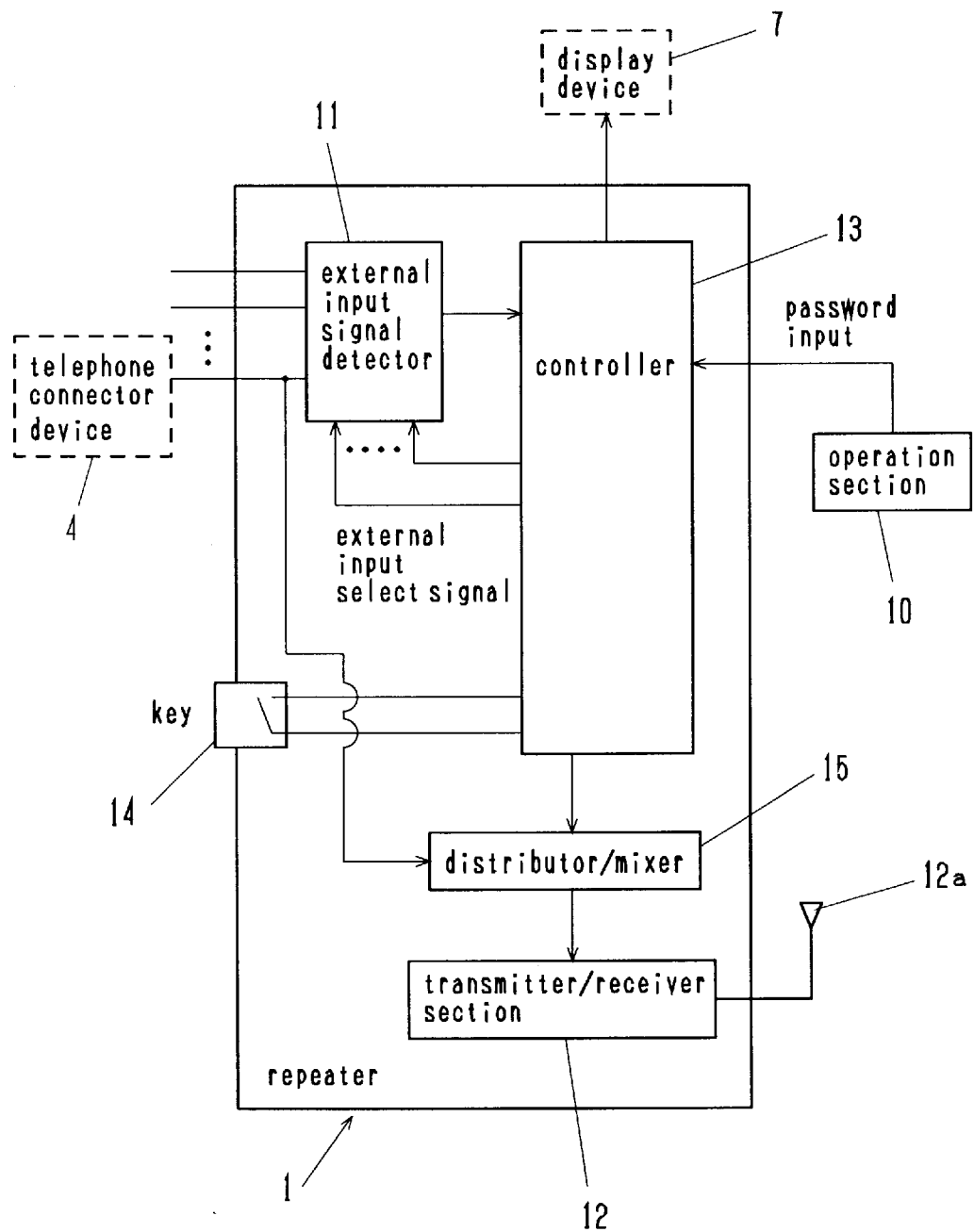
FIG. 10 is a block diagram of the repeater of a third embodiment.

An apparatus configuration of a third embodiment of the invention is shown in FIG. 10. This is aimed at simultaneous multidirectional voice communications (simultaneous multidirectional telecommunications including telephone) between an outside party linked to a telephone line and all of the persons using transmitter-receivers. This embodiment is attained by adding a distributor/mixer section 15 to any one of the first and second embodiments. The distributor/mixer section 15 serves to distribute a signal from the transmitter-receiver to a telephone line, and also functions to couple a signal from an associated telephone line to the transmitter-receiver(s); this section 15 constitutes circuitry for performing simultaneous multidirectional communications. As the means for selectively enabling and disenabling the operations of distributor/mixer section 15, there may be employed an arrangement for receiving external signal inputs as described in connection with the first embodiment that is, the key inputs and/or password inputs.

The proceedings up to entry of the simultaneous multi-directional voice communications will be described below. Assume that a telephone call is received from the outside. In this case, one of persons having the transmitter-receiver disconnects the connector 6 of the telephone terminal machine and connects it to his or her own transmitter-receiver. Under the condition, since this transmitter-receiver comes with the covert function, it will no longer occur that the conversation content over telephone is transmitted to other transmitter-receivers. If the simultaneous multidirectional communications are required here, the operation section 10 of repeater 1 is operated to change over to the "simultaneous multidirectional communications" mode, whereby the telephone line is connected to the other transmitter-receivers providing communicationability. Note however that the transmitter-receiver being presently connected by the connector is still effective in the covert function; therefore, such transmitter-receiver cannot join the simultaneous multidirectional communications. On the other hand, when the connector is out of the transmitter-receiver and then is put on hook 43, the telephone call is gone away. This may be eliminated by preventing the connector from being hung on the hook and by letting it be free after disconnection from the transmitter-receiver, thereby enabling this transmitter-receiver to join the simultaneous multidirectional communications. After completion of the simultaneous multidirectional communications, the connector is put on the hook to turn off the telephone.

In this embodiment, selecting of the simultaneous multidirectional communication functions may enable the owner of a telephone linked to the telephone lines to make conversations by way of repeater 1 with one or a plurality of transmitter-receiver users.

While the invention is with the informing device added to the repeater and the telephone connector, the meaning of the language "added" covers any possible arrangements where the informing device and telephone connector are externally coupled to the repeater that is, an arrangement wherein each of them stands independent of others in hardware structure, and an arrangement in which the informing device and telephone connector are built in the inside of the repeater to provide an integral structure.

The present may also encompass in scope an arrangement wherein no telephone connector is additionally coupled to the repeater while allowing a sound-shielded headset to be connected to the telephone connector providing the use of an ordinary telephone set therefor.

The invention further encompasses, regarding the embodiment for causing the communication means to be attached to or held at or near the human body, the case where the same is embedded in an earmuff or in a head band as part of the headset, or the case where it is incorporated in the vicinity of the headset by cables or radiocommunication techniques.

What is claimed is:

1. A simultaneous multidirectional communication apparatus comprising a repeater, and a plurality of transmitter-receivers simultaneously communicatable using radio waves with one another multidirectionally by way of said repeater, wherein a sound-shielded headset is adapted for said transmitter-receivers, and communication means is held at or near a human body, said communication means including a sound input/output section with a microphone and a speaker, and a transmitter/receiver function section for execution of signal processing tasks required for communications, characterized by comprising informing means for providing a warning signal and/or information to a user of a transmitter-receiver operatively coupled to said repeater, and said repeater transmitting information representative of an external signal input toward all of said transmitter-receivers by way of said informing means.

2. The apparatus according to claim 1, characterized in that the external signal input is a telephone reception signal.

3. The apparatus according to claim 1, characterized in that the external signal input is a signal indicative of one of failure in a machinery equipment and a warning signal thereof.

4. The apparatus according to claim 1, characterized in that the external signal input is an audio signal representative of one of a human voice, notice, broadcast, and music.

5. The apparatus according to claim 1, characterized in that said repeater includes external signal input detector means for selecting external input signals to be received.

6. The apparatus according to claim 1, characterized in that said informing means includes means for sending forth sound toward all of said transmitter-receivers and/or display means, and that occurrence of failure in the machinery equipment and a warning signal therefor is informed using sound, light and/or display.

7. The apparatus according to claim 6, characterized in that said display means includes an informing lamp for turning on to acknowledge occurrence of failure in the machinery equipment, including a warning signal therefor.

8. A simultaneous multidirectional communication apparatus comprising a repeater, and a plurality of transmitter-receivers simultaneously communicatable using radio waves with one another multidirectionally by way of said repeater, wherein a sound-shielded headset is used for said transmitter-receivers, and a communication means is held at or near a human body, said communication means having a sound input/output section with a microphone and a speaker, and a transmitter/receiver function section for performing signal processing tasks required for communications, characterized by comprising a telephone connector device for connecting a telephone line to said transmitter-receiver, and informing means for warning or informing a user of the transmitter-receiver being coupled to said repeater, and in that said repeater informs all of the transmitter-receivers by way of said informing means based on a telephone reception signal as fed from said telephone connector device.

9. The apparatus according to claim 8, characterized in that the transmitter-receiver and said telephone connector device are connected by a cable with each other.

10. The apparatus according to claim 8, characterized in that the transmitter-receiver and said telephone connector device are connected by way of optical communication scheme.

11. The apparatus according to claim 8, characterized in that the transmitter-receiver and said telephone connector device are connected by way of radio communication apparatus.

12. The apparatus according to claim 8, characterized in that said informing means includes means for sending forth an informative sound toward all of said transmitter-receivers upon reception of a telephone call, and that a specific kind of sound is used to distinguish the informative sound from other warning signals.

13. The apparatus according to claim 8, characterized in that said repeater comprises external signal input detector means for selecting a telephone receipt signal from said telephone connector device and a signal due to another external signal input.

14. The apparatus according to claim 8, characterized in that the transmitter-receiver includes means for causing when connected to said telephone connector device the transmitter-receiver to interrupt communication functions with other transmitter-receivers, and means for recovering the communication functions with the other transmitter-receivers when disconnected from said telephone connector device, and that said repeater has a communication retaining function for enabling communications with the other transmitter-receivers while the transmitter-receiver is connected to said telephone connector device.

15. The apparatus according to claim 8, characterized in that said informing means includes means for sending forth a sound toward all of said transmitter-receivers and/or display means, and that upon reception of a telephone signal a corresponding notice is informed using sounds and/or visual indications.

16. The apparatus according to claim 15, characterized in that said display means includes an indicator lamp for informing the notice upon reception of a telephone signal by emission of light therefrom.

17. A simultaneous multidirectional communication apparatus comprising a repeater, and a plurality of transmitter-receivers simultaneously communicatable using radio waves with one another multidirectionally by way of said repeater, wherein a sound-shielded headset is used for said transmitter-receiver, and a communication means is held at or near a human body, said communication means including a sound input/output section having a microphone and a speaker, and a transmitter/receiver function section for performing signal processing tasks required for voice communications, characterized by comprising a telephone connector device for connecting a telephone line to said transmitter-receiver, and informing means for warning or informing a user of a transmitter-receiver being coupled to said repeater, and in that said repeater includes a communication section for permitting conversations over telephones by way of said repeater between a telephone user presently linked to a telephone line and one or a plurality of transmitter-receiver users, while said repeater performs transmission to all of the transmitter-receivers by way of said informing means based on a telephone reception signal as outputted from said telephone connector device.

18. The apparatus according to claim 17, characterized in that the transmitter-receiver includes means for interrupting communication functions with other transmitter-receivers when connected to said telephone connector device, and means for recovering the communication functions between the other transmitter-receivers when connection with said telephone connector devise is disconnected, and that said repeater has a communication retaining function for enabling communications between said the other transmitter-receivers when the transmitter-receiver is connected to said telephone connector device.

19. A sound shielded headset having a sound insulative structure, said headset comprising:

communication means for being held at or near a human body, including a sound input/output section with a microphone and a speaker, and a transmitter/receiver function section for performing signal processing tasks required for communications; and connector means for causing said communication means to be operatively coupled by a telephone connector device to telephone lines.

20. The headset according to claim 19, characterized in that said connector means is in one of a telephone cord connection apparatus, an optical communication apparatus, and a radiocommunication apparatus.

21. The headset according to claim 19, characterized in that the transmitter/receiver function section of said communication means includes a first transmitter/receiver function section for performing signal processing tasks with respect to a sound input/output section, and a second transmitter/receiver function section for performing signal processing tasks between it and said first transmitter/receiver function section and those between a telephone connector device and a repeater, and that said first transmitter/receiver function section is provided in means for being attached to a human body involving auditory sensible portions, whereas said second transmitter/receiver function section is attached at or near the human body.

* * * * *